(12) United States Patent
Le Saint

(10) Patent No.: US 9,967,090 B2
(45) Date of Patent: *May 8, 2018

(54) EFFICIENT METHODS FOR PROTECTING IDENTITY IN AUTHENTICATED TRANSMISSIONS

(71) Applicant: VISA INTERNATIONAL SERVICE ASSOCIATION, San Francisco, CA (US)

(72) Inventor: Eric Le Saint, Los Altos, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/489,409

(22) Filed: Apr. 17, 2017

(65) Prior Publication Data

US 2017/0222801 A1  Aug. 3, 2017

Related U.S. Application Data

(63) Continuation of application No. 14/595,792, filed on Jan. 13, 2015, now Pat. No. 9,647,832.

(Continued)

(51) Int. Cl.
*H04L 9/32* (2006.01)
*H04L 9/08* (2006.01)
(Continued)

(52) U.S. Cl.
CPC .......... *H04L 9/0819* (2013.01); *H04L 9/0844* (2013.01); *H04L 9/14* (2013.01);
(Continued)

(58) Field of Classification Search
CPC .................. H04L 2209/56; H04L 9/0844
(Continued)

(56) References Cited

U.S. PATENT DOCUMENTS

| 6,453,159 | B1 | 9/2002 | Lewis |
| 7,254,232 | B2 | 8/2007 | DiSanto |

(Continued)

FOREIGN PATENT DOCUMENTS

| KR | 1020080074956 | 8/2008 |
| WO | 2013/023968 A1 | 2/2013 |

(Continued)

OTHER PUBLICATIONS

Brzuska, et al., "An Analysis of the EMV Channel Establishment Protocol", CCS'13, Nov. 4-8, 2013, Berlin, Germany, ACM 978 1-4503-2477-9/13/11, pp. 373-385.

(Continued)

*Primary Examiner* — Teshome Hailu
(74) *Attorney, Agent, or Firm* — Kilpatrick Townsend Stockton LLP

(57) ABSTRACT

Systems and methods are provided for protecting identity in an authenticated data transmission. For example, a contactless transaction between a portable user device and an access device may be conducted without exposing the portable user device's public key in cleartext. In one embodiment, an access device may send an access device public key to a portable user device. The user device may return a blinded user device public key and encrypted user device data. The access device may determine a shared secret using the blinded user device public key and an access device private key. The access device may then decrypt the encrypted user device data using the shared secret.

25 Claims, 10 Drawing Sheets

Related U.S. Application Data

(60) Provisional application No. 61/926,908, filed on Jan. 13, 2014.

(51) Int. Cl.
    *H04L 29/06*     (2006.01)
    *H04L 9/14*     (2006.01)
    *H04W 12/04*     (2009.01)

(52) U.S. Cl.
    CPC .......... *H04L 63/061* (2013.01); *H04W 12/04* (2013.01); *H04L 2209/04* (2013.01); *H04L 2209/24* (2013.01); *H04L 2209/56* (2013.01)

(58) Field of Classification Search
    USPC ........................................................ 713/171
    See application file for complete search history.

(56) References Cited

U.S. PATENT DOCUMENTS

| | | | |
|---|---|---|---|
| 7,267,760 | B2 | 9/2007 | Sherman et al. |
| 7,627,760 | B2* | 12/2009 | Lauter ................ H04L 9/0847 380/44 |
| 7,707,420 | B1* | 4/2010 | Little ................ H04L 9/3247 380/30 |
| H2270 | H | 6/2012 | Le Saint et al. |
| 8,200,974 | B1 | 6/2012 | DiSanto |
| 2005/0084114 | A1 | 4/2005 | Jung et al. |
| 2006/0265595 | A1 | 11/2006 | Scottodiluzio |
| 2007/0028090 | A1 | 2/2007 | Lopez et al. |
| 2007/0033403 | A1* | 2/2007 | Lauter ................ H04L 9/0847 713/171 |
| 2007/0288743 | A1 | 12/2007 | Cam-Winget et al. |
| 2008/0040603 | A1 | 2/2008 | Stedron |
| 2008/0133918 | A1* | 6/2008 | You ................ H04L 9/0869 713/175 |
| 2009/0318114 | A1 | 12/2009 | Bertoni |
| 2011/0307698 | A1 | 12/2011 | Vanstone |
| 2012/0066505 | A1* | 3/2012 | Brown ................ H04L 9/0822 713/183 |
| 2012/0087493 | A1 | 4/2012 | Chidambaram |
| 2012/0137132 | A1 | 5/2012 | Le Saint |
| 2012/0221858 | A1 | 8/2012 | Struik |
| 2012/0314865 | A1 | 12/2012 | Kitchen |
| 2013/0016831 | A1 | 1/2013 | Lambert |
| 2013/0091353 | A1 | 4/2013 | Zhang et al. |
| 2013/0195271 | A1 | 8/2013 | Miyabayashi et al. |
| 2013/0219189 | A1 | 8/2013 | Simmons |
| 2013/0301828 | A1* | 11/2013 | Gouget ................ H04L 9/0844 380/44 |
| 2013/0332739 | A1 | 12/2013 | Yi et al. |
| 2014/0003604 | A1 | 1/2014 | Campagna |
| 2014/0013121 | A1 | 1/2014 | Sherkin et al. |
| 2014/0208117 | A1 | 7/2014 | Hayashi et al. |
| 2014/0281542 | A1 | 9/2014 | O'hare et al. |
| 2014/0365776 | A1 | 12/2014 | Smets et al. |
| 2015/0200774 | A1 | 7/2015 | Le Saint |
| 2015/0372811 | A1 | 12/2015 | LeSaint |
| 2016/0065370 | A1 | 3/2016 | Le Saint et al. |

FOREIGN PATENT DOCUMENTS

| | | |
|---|---|---|
| WO | 2014/109283 A1 | 7/2014 |
| WO | 2016/033610 A1 | 3/2016 |

OTHER PUBLICATIONS

PCT/US2015/011153, "International Preliminary Report on Patentability", dated Jul. 28, 2016, 7 pages.

PCT/US2016/015218, "International Search Report and Written Opinion", dated May 12, 2016, 17 pages.

"Tomorrow's Transactions," HCE and BLE University, London, 20th Mar. 2014, Consult Hyperion, http://tomorrowstransactions.com. 18 pages.

International Search Report and Written Opinion dated Apr. 28, 2015 in PCT/US2015/011153, 10 pages.

U.S. Appl. No. 62/014,102, filed Jun. 18, 2014, entitled, "Efficient Methods for Authenticated Communication," 108 pages.

U.S. Appl. No. 62/016,048, filed Jun. 23, 2014, entitled, "Efficient Methods for Forward Secure Authenticated Communication," 177 pages.

U.S. Appl. No. 62/044,172, filed Aug. 29, 2014, entitled, "Methods for Secure Cryptogram Generation," 106 pages.

PCT/US2017/036380, "International Search Report and Written Opinion", dated Oct. 13, 2017, 14 pages.

Brzuska et al., "An Analysis of the EMV Channel Establishment Protocol", Nov. 5, 2013, pp. 1-30.

Dagdelen et al., "11A Cryptographic Analysis of Opacity", International Association for Cryptologic Research, vol. 20130429:112002, Apr. 22, 2013, pp. 1-46.

EP15735349.1, "Partial Supplementary European Search Report", dated Dec. 14, 2017, 9 pages.

\* cited by examiner

EFFICIENT METHODS FOR PROTECTING IDENTITY IN AUTHENTICATED TRANSMISSIONS

CROSS-REFERENCES TO RELATED APPLICATIONS

The present application is a continuation application of U.S. patent application Ser. No. 14/595,792, filed on Jan. 13, 2015 and titled EFFICIENT METHODS FOR PROTECTING IDENTITY IN AUTHENTICATED TRANSMISSIONS, which claims priority to U.S. Provisional Application No. 61/926,908, filed on Jan. 13, 2014, the entire contents of which are hereby incorporated by reference for all purposes.

BACKGROUND

As contactless payment devices such as NFC-enabled mobile phones and contactless cards continue to increase in popularity, maintaining the security of payment transactions continues to be a concern. For example, in one scenario, an attacker may attempt to eavesdrop on a contactless transaction (e.g., by using a concealed radio receiver). Even if payment information is encrypted or otherwise protected, the attacker may attempt to determine the identity of a user conducting a transaction. If determined, the identity of the user could be used for illicit purposes.

Embodiments of the present invention address these problems and other problems individually and collectively.

BRIEF SUMMARY

Embodiments of the invention relate to efficient methods for protecting identity in an authenticated data transmission. For example, a contactless transaction between a portable user device and an access device may be conducted without exposing the portable user device's public key in cleartext.

In one embodiment, an access device public key may be received from an access device by a portable user device. A blinded user device public key may be generated from a user device public key stored on the portable user device and a cryptographic nonce (e.g., a random value). Similarly, a blinded user device private key may be generated from a user device private key corresponding the user device public key and the cryptographic nonce. Next, a shared secret may be generated using the blinded user device private key and the ephemeral public key. The shared secret may be used derive a session key, and the session key may be used to encrypt user device data such as a user device certificate. The encrypted user device data and the blinded user device public key can then be sent to the access device. The access device can re-generate the shared secret using the blinded user device public key and the access device private key. The shared secret may then be used to re-generate the session key and decrypt the encrypted user device data. Thus, the access device can obtain and verify the user device certificate without the certificate being transmitted in cleartext.

TERMS

Figure 1:
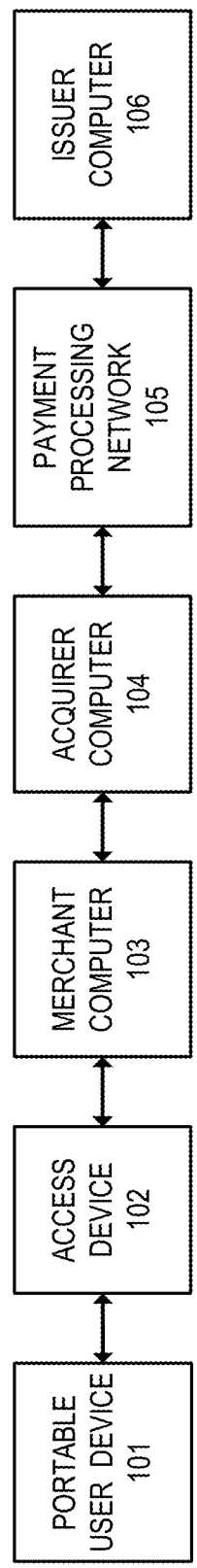
FIG. 1 shows an example of a system that may be used with embodiments of the invention.

Prior to discussing embodiments of the invention, description of some terms may be helpful in understanding embodiments of the invention.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

The term "public/private key pair" may include a pair of linked cryptographic keys generated by an entity. The public key may be used for public functions such as encrypting a message to send to the entity or for verifying a digital signature which was supposedly made by the entity. The private key, on the other hand may be used for private functions such as decrypting a received message or applying a digital signature. The public key will usually be authorized by a body known as a Certification Authority (CA) which stores the public key in a database and distributes it to any other entity which requests it. The private key will typically be kept in a secure storage medium and will usually only be known to the entity. However, the cryptographic systems described herein may feature key recovery mechanisms for recovering lost keys and avoiding data loss. Public and private keys may be in any suitable format, including those based on RSA or elliptic curve cryptography (ECC).

A "digital signature" may refer to the result of applying an algorithm based on a public/private key pair, which allows a signing party to manifest, and a verifying party to verify, the authenticity and integrity of a document. The signing party acts by means of the private key and the verifying party acts by means of the public key. This process certifies the authenticity of the sender, the integrity of the signed document and the so-called principle of nonrepudiation, which does not allow disowning what has been signed. A certificate or other data that includes a digital signature by a signing party is said to be "signed" by the signing party.

A "certificate" or "digital certificate" may include an electronic document or data file that uses a digital signature to bind a public key with data associated with an identity. The certificate may include one or more data fields, such as the legal name of the identity, a serial number of the certificate, a valid-from and valid-to date for the certificate, certificate-related permissions, etc. A certificate may contain a "valid-from" date indicating the first date the certificate is valid, and a "valid-to" date indicating the last date the certificate is valid. A certificate may also contain a hash of the data in the certificate including the data fields. Unless otherwise noted, each certificate is signed by a certificate authority.

A "certificate authority" (CA) may include one or more server computers operatively coupled to issue certificates to entities. The CA may prove its identity using a CA certificate, which includes the CA's public key. The CA certificate may be signed by another CA's private key, or may be signed by the same CA's private key. The latter is known as a self-signed certificate. The CA may maintain a database of all certificates issued by the CA, and may also maintain a list of revoked certificates.

In a typical process, the certificate authority receives an unsigned certificate from an entity whose identity is known. The unsigned certificate includes a public key, one or more data fields, and a hash of the data in the certificate. The CA signs the certificate with a private key corresponding to the public key included on the CA certificate. The CA may then store the signed certificate in a database, and issue the signed certificate to the entity.

A "cryptographic nonce" may include any number, string, bit sequence, or other data value intended to be used in association with a single communication session. In some cases, a cryptographic nonce may be randomly or pseudo-randomly generated. Typically, a cryptographic nonce is of sufficient length as to make insignificant the likelihood of independently generating the same nonce value multiple times.

A "blinded key," such as a "blinded public key" may include a key that has been obfuscated or otherwise modified from its original value by combination with another data element, such as a cryptographic nonce. For example, in elliptic curve cryptography, a public key may be multiplied by the nonce to generate a "blinded public key." Similarly, a private key may be multiplied by the nonce to generate a "blinded private key."

An "ephemeral key pair" may include a public key (i.e., an "ephemeral public key") and a private key (i.e., an "ephemeral private key") generated for use with a single transaction or other communication session. The ephemeral key pair may be of any suitable format, such as ECC or RSA. Typically, an ephemeral key pair may is deleted once the transaction or communication session has concluded.

An "encryption key" may include any data value or other information suitable to cryptographically encrypt data. A "decryption key" may include any data value or other information suitable to decrypt encrypted data. In some cases, the same key used to encrypt data may be operable to decrypt the data. Such a key may be known as a symmetric encryption key.

The term "user device data" may include any data or information associated with a user device. Examples of user device data may include a name of a user associated with the user device, an organization associated with the user device, payment information such as a primary account number (PAN) associated with the user device, an expiration date of the user device, a certificate associated with the user device, etc.

DETAILED DESCRIPTION

Embodiments of the invention relate to efficient methods for protecting identity in an authenticated data transmission. For example, a contactless transaction between a portable user device and an access device may be conducted without exposing the portable user device's public key in cleartext.

In one embodiment, an access device public key may be received from an access device by a portable user device. A blinded user device public key may be generated from a user device public key stored on the portable user device and a cryptographic nonce (e.g., a random value). Similarly, a blinded user device private key may be generated from a user device private key corresponding the user device public key and the cryptographic nonce. Next, a shared secret may be generated using the blinded user device private key and the ephemeral public key. The shared secret may be used derive a session key, and the session key may be used to encrypt user device data such as a user device certificate. The encrypted user device data and the blinded user device public key can then be sent to the access device. The access device can re-generate the shared secret using the blinded user device public key and the access device private key. The shared secret may then be used to re-generate the session key and decrypt the encrypted user device data. Thus, the access device can obtain and verify the user device certificate without the certificate being transmitted in cleartext.

Embodiments can protect the identity of a portable user device or other entity in a secure communication. In some cases, an attacker may snoop or otherwise monitor data communicated between an access device and a portable user device. Since embodiments of the invention can avoid transmitting any identifiable information (such as a user device's public key) in cleartext, the identity of the portable user device is protected from unauthorized entities.

Embodiments can also achieve authenticated communication using only a single request and a single response. This allows fast authentication with reduced latency, and allows the integration of the security properties of embodiments into other existing request/response flows, without additional requests. For example, in some embodiments, the disclosed protocol data can be appended to the existing request/response.

Furthermore, embodiments can provide faster and more efficient communication in the case of a portable user device and access device that have previously communicated. In some embodiments, a registry at a portable user device may be used to store future shared secret and future blinded public key values for one or more access devices. An analogous registry at an access device can be used to store future shared secret and future user device identifier values for one or more user devices. Thus, if a user device and an access device communicate multiple times, the stored data may be used. This can avoid certain operations, such as the elliptic-curve Diffie-Hellman (ECDH) algorithm, that may be relatively time and power intensive. This can also provide users of contactless devices an improved experience, since a portable user device and access device may not need to be held together for as long. For example, in accordance with some embodiments, secure and private communication between two devices can be conducted in less than 50 ms.

Embodiments can also appear identical to systems that do not use blinded keys to eavesdroppers, since an eavesdropper would not know whether a public key transmitted from a portable user device to an access device or vice-versa was a blinded or an non-blinded public key. Thus, embodiments can provide protection against reverse engineering of the protocol.

I. Systems

FIG. 1 shows a system according to an embodiment of the invention. The system comprises a user (not shown) who may operate a portable user device 101. The user may use portable user device 101 to conduct payment transactions in communication with an access device 102. As used herein, a "portable user device" may include a mobile phone, tablet, credit card, debit card, or any other suitable device. As used herein, an "access device" may include any computing device suitable to communicate with a portable user device. In some embodiments, access device 102 may directly communicate with portable user device 101. In other embodiments, access device 102 may communicate to portable user device 101 via an interface device, such as a smart watch, smart glasses, or any other suitable device. Access device 102 may be connected to merchant computer 103, which may be connected to acquirer computer 104. Acquirer computer 104 may be connected to issuer computer 106 via payment processing network 105.

As used herein, an "issuer" may typically refer to a business entity (e.g., a bank) that maintains financial accounts for a user and often issues a portable user device 101 such as a credit or debit card to the user. A "merchant" is typically an entity that engages in transactions and can sell goods or services. An "acquirer" is typically a business entity (e.g., a commercial bank) that has a business relationship with a particular merchant or other entity. Some entities can perform both issuer and acquirer functions. Some embodiments may encompass such single entity issuer-acquirers. Each of the entities may comprise one or more computer apparatuses (e.g., merchant computer 103, acquirer computer 104, payment processing network 105, and issuer computer 106) to enable communications, or to perform one or more of the functions described herein.

The payment processing network 105 may include data processing subsystems, networks, and operations used to support and deliver certificate authority services, authorization services, exception file services, transaction scoring services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 105 may include one or more server computers. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 105 may use any suitable wired or wireless network, including the Internet.

In some payment transactions, the user purchases a good or service at a merchant using a portable user device 101. The user's portable user device 101 can interact with an access device 102 at a merchant associated with merchant computer 103. For example, the user may tap the portable user device 101 against an NFC reader in the access device 103. Alternatively, the user may indicate payment details to the merchant over a computer network, such as in an online transaction.

An authorization request message for a transaction may be generated by access device 102 or merchant computer 103 and then forwarded to the acquirer computer 104. After receiving the authorization request message, the authorization request message is then sent to the payment processing network 105. The payment processing network 105 then forwards the authorization request message to the corresponding issuer computer 106 associated with an issuer associated with the portable user device 101.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

After the issuer computer 106 receives the authorization request message, the issuer computer 106 sends an authorization response message back to the payment processing network 105 to indicate whether the current transaction is authorized (or not authorized). The payment processing network 105 then forwards the authorization response message back to the acquirer computer 104. In some embodiments, payment processing network 105 may decline the transaction even if issuer computer 106 has authorized the transaction, for example depending on a value of the fraud risk score. The acquirer computer 104 then sends the response message back to the merchant computer 103.

An "authorization response message" may be an electronic message reply to an authorization request message generated by an issuing financial institution 106 or a payment processing network 105. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network 105) to the merchant computer 103 that indicates approval of the transaction. The code may serve as proof of authorization. As noted above, in some embodiments, a payment processing network 105 may generate or forward the authorization response message to the merchant.

After the merchant computer 103 receives the authorization response message, the merchant computer 103 may then provide the authorization response message for the user. The response message may be displayed by the access device 102, or may be printed out on a physical receipt. Alternately, if the transaction is an online transaction, the merchant may provide a web page or other indication of the authorization response message as a virtual receipt. The receipts may include transaction data for the transaction.

At the end of the day, a normal clearing and settlement process can be conducted by the payment processing network 105. A clearing process is a process of exchanging financial details between an acquirer and an issuer to facilitate posting to a customer's payment account and reconciliation of the user's settlement position.

II. Authenticated Communication Methods

Figure 2:
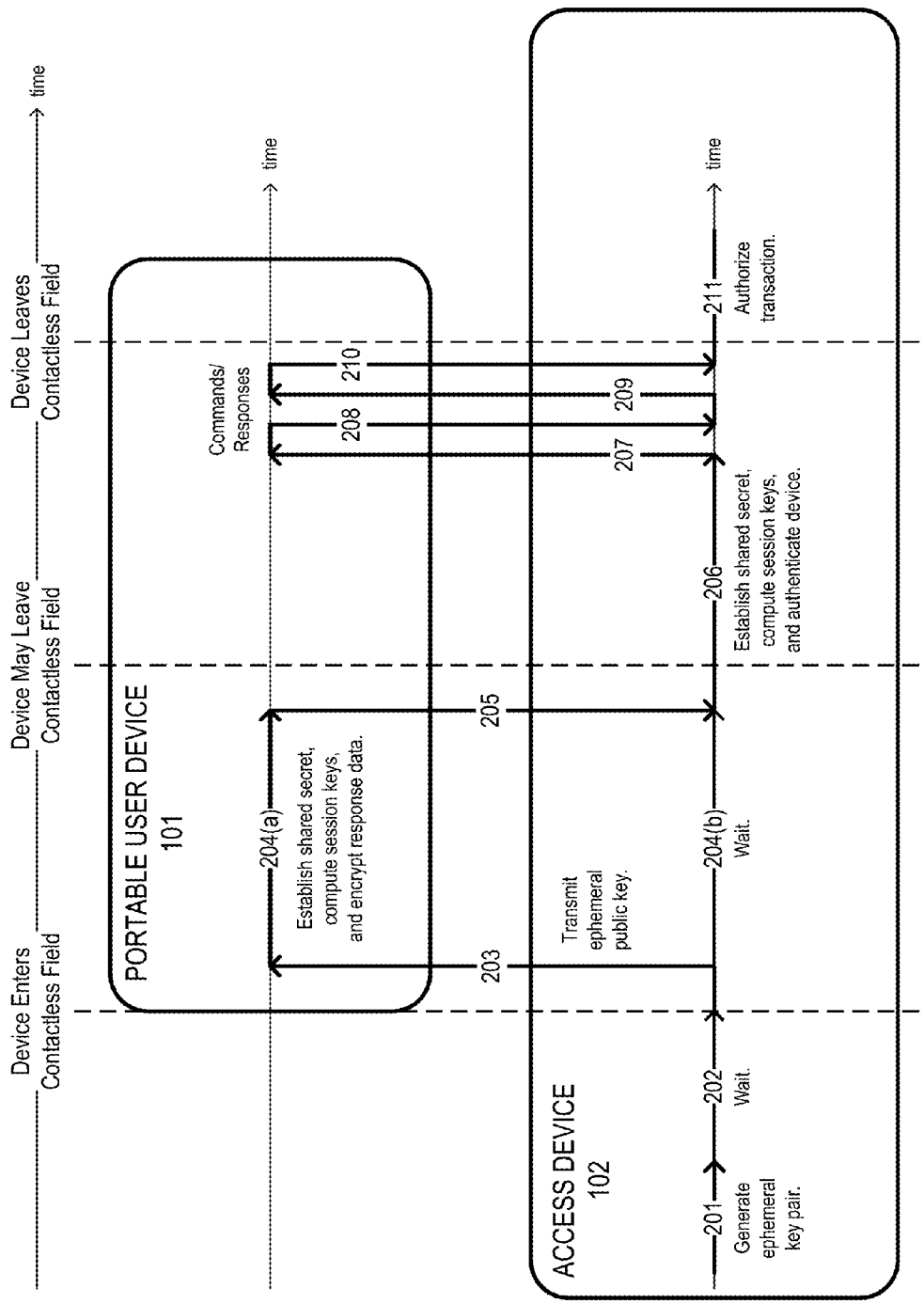
FIG. 2 shows a diagram of communication between an access device and a user device in accordance with some embodiments of the invention.

FIG. 2 shows a diagram of communication between a portable user device 101 and an access device 102 in accordance with some embodiments of the invention. In some embodiments, the interaction shown in FIG. 2 may take place as part of a payment transaction. For example, if portable user device 101 is a contactless chip card, a user may tap or swipe the chip card against an access device 102 operated by a merchant.

At step 201, access device 102 generates an ephemeral public/private key pair. The public/private key pair may be generated in any suitable manner, such as through the use of a random or pseudo-random number generator. In addition, the key pair may be generated in any suitable key format, such as RSA or elliptic curve cryptography (ECC). In some embodiments, the ephemeral key pair may be generated before portable user device 101 enters the contactless field of access device 102.

At step 202, access device 102 waits for some period of time after generating the ephemeral key pair for a portable user device 101 to enter the contactless field of access device 102.

At step 203, once portable user device 101 enters the contactless field of access device 102, access device 102 transmits to portable user device 101 the ephemeral public key of the key pair generated at step 201.

At step 204(*a*), portable user device 101 uses the received ephemeral public key to establish a shared secret with access device 101. Portable user device 101 then uses the shared secret to derive a session key, and uses the session key to encrypt response data. In some embodiments, the shared secret may be determined by combining the received ephemeral public key with a user device private key and a cryptographic nonce.

At step 204(*b*), access device 102 waits for a response from portable user device 101.

At step 205, portable user device 101 sends a response message to access device 101. The response message may include the encrypted response data and other data. For example, in some embodiments, the response message may include a blinded user device public key that access device 102 can use to determine the same shared secret established by user device 101 in step 204(*a*). In some embodiments, the encrypted response data may include payment information such as a primary account number (PAN), an account expiration date, etc. In some embodiments, the payment information may be included as part of a user device certificate.

At step 206, access device 102 establishes the same shared secret established by portable user device 101 at step 204(*a*). Access device 102 then generates a session key using the shared secret, and uses the session key to decrypt the encrypted response data. The decrypted response data can be used by access device 102 to authenticate portable user device 101. For example, in embodiments wherein the response data includes a user device certificate, the certificate's signature can be verified using a digital signature algorithm.

At steps 207-210, in some embodiments, access device 102 and portable user device 101 may exchange commands and responses. For example, access device 101 may request additional data from portable user device 101, or portable user device 101 may request transaction information from access device 102. Typically, the commands and responses may be encrypted using a session key derived from the shared secret previously established between portable user device 101 and access device 102. In addition, it should be noted that although four messages 207-210 are shown in FIG. 2, any number of messages may be exchanged between devices 101 and 102.

At step 211, access device 102 authorizes a transaction using the response data provided by portable user device 101. For example, in some embodiments, access device 101 may generate an authorization request message as described with reference to FIG. 1, and include in the authorization request message payment information associated with portable user device 101. Typically, portable user device 101 may leave the contactless field of access device 101 before the transaction is authorized. In some embodiments, once an authorization response message is received, access device 101 can provide an indication to the user of whether the transaction was authorized.

Although FIG. 2 describes an example of communication between portable user device 101 and access device 102, embodiments are not limited to the above description. For example, some embodiments may skip command and response steps 207-210. In some such embodiments, portable user device 101 may leave the contactless field of access device 101 after step 205.

Alternatively, in some embodiments, access device 102 may authorize the transaction after a response message is received at step 205, but prior to sending one or more messages to portable user device 101. For example, in one embodiment, an account balance stored on portable user device 101 may be updated after access device 102 determines that the transaction has been authorized by the issuer of portable user device 101.

A. Access Device

Figure 3:
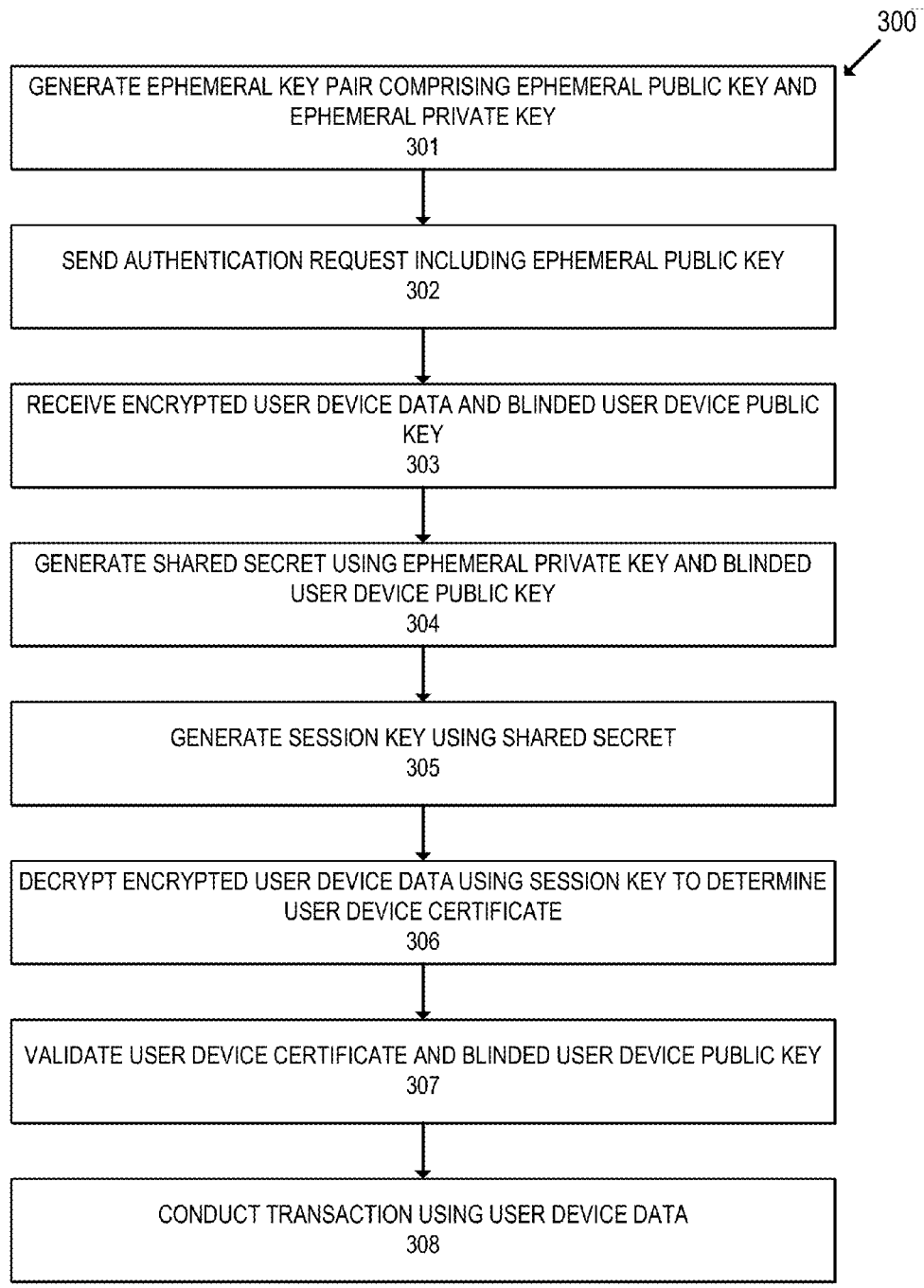
FIG. 3 shows a method of securely obtaining user device data from a user device.

FIG. 3 shows a method 300 of securely obtaining user device data. In some embodiments, method 300 may be performed in conjunction with method 400 of FIG. 4, wherein the method 300 is performed by an access device 102, and method of 400 is performed by a user device 101.

In some embodiments, method 300 may take place as part of a payment transaction. For example, if user device 101 is a contactless chip card, a user may tap or swipe the chip card against an access device 102 operated by a merchant.

Typically, before the method, portable user device 101 may generate or be loaded with a user device key pair. A "user device key pair" may include a public key (i.e., a "user device public key") and a private key (i.e., a "user device private key"). User device 101 may also comprise a "user device certificate" including the user device public key. The user device certificate may be signed by a certificate authority, such as payment processing network 105 or issuer computer 106.

At step 301, an ephemeral key pair is generated. An "ephemeral key pair" may include a public key (i.e., an "ephemeral public key") and a private key (i.e., an "ephemeral private key") generated for use with a single transaction or other communication session. The ephemeral key pair may be of any suitable format, such as ECC or RSA. Typically, the ephemeral key pair may be deleted once a communication session between the access device 102 and the portable user device 101 has ended.

At step 302, an authentication request is sent to portable user device 101 including the ephemeral public key. In some embodiments, the authentication request can also include an access device identifier associated with access device 102. An "access device identifier" may include any data suitable to identify an access device. For example, an access device identifier may be a serial number, globally unique identifier (GUID), network address, or any other suitable identifier. In some embodiments, the authentication request may be sent when access device 102 detects a portable user device 101, such as if it passes close to a contactless transceiver.

At step 303, encrypted user device data and a blinded user device public key are received from portable user device 101. A "blinded user device public key" may be generated from a user device public key. For example, the blinded user device public key may be a combination of the user device public key and a cryptographic nonce. The "encrypted user device data" may include any data or information associated with a user device. For example, in some embodiments, the encrypted user device data may include an encrypted user device certificate and the cryptographic nonce used to generate the blinded user device public key.

At step 304, a shared secret is generated using the ephemeral private key generated at step 301 and the blinded user device public key received at step 303. The shared secret may be generated using any suitable method. For example, in embodiments using elliptic curve cryptography, the shared secret may be determined using the elliptic-curve Diffie-Hellman protocol (ECDH).

At step 305, a session key is generated using the shared secret generated at step 304. The session key may be of any suitable format (e.g., AES, DES, Blowfish, etc.), of any suitable length, and generated using any suitable key derivation function. For example, in one embodiment, the session key may be generated using the Password-Based Key Derivation Function 2 (PBKDF2) algorithm. In some embodiments, other data, such as an access device identifier, may be used as additional inputs to the key derivation function.

At step 306, the encrypted user device data is decrypted using the session key to determine a user device certificate. The user device certificate may include any digital certificate that attests the identity of user device 101. In some embodiments, the user device certificate may include information relating to user device 101 and/or a user associated with user device 101, such as the public key of the user device key pair stored on the user device, the user's name, a primary account number (PAN) associated with user device 101, the account's expiration date, etc. The user device certificate may be signed by a certificate authority (CA). In some cases, the decrypted user device data may also include a cryptographic nonce used to generate the blinded user device public key.

At step 307, the user device certificate and blinded user device public key are validated.

Validating the user device certificate may include ensuring that the signature of the user device certificate matches an expect value based on a known CA public key. For example, in some embodiments, a digital signature algorithm, such as the elliptic curve digital signature algorithm (ECDSA) may be used to validate the user device certificate.

Validating the blinded user device public key may include ensuring that the blinded user device public key matches an expected value. For example, in some cases, a second blinded user device public key may be generated using the user device public key included on the user device certificate, and the cryptographic nonce decrypted at step 306. The second blinded user device public key may then be compared to the blinded user device public key received at step 303 to ensure that the keys match. Alternatively, in some cases, the blinded user device public key received at step 303 may be validated by comparing it to a stored blinded user device public key.

At step 308, if the user device certificate and blinded user device public key are validated, a transaction is conducted using the user device data. For example, in some embodiments, an authorization request message may be generated as described with reference to FIG. 1. In some embodiments, once an authorization response message is received, an indication can be provided to the user of whether the transaction was successful.

It should be noted that although the method of FIG. 3 is described with reference to an ephemeral key pair, embodiments are not limited to the use of ephemeral keys. For example, in some embodiments, access device 102 may maintain a persistent key pair (i.e., an "access device public/private key pair"), and use the access device public and private keys in place of the ephemeral public and private keys, respectively.

B. User Device

Figure 4:
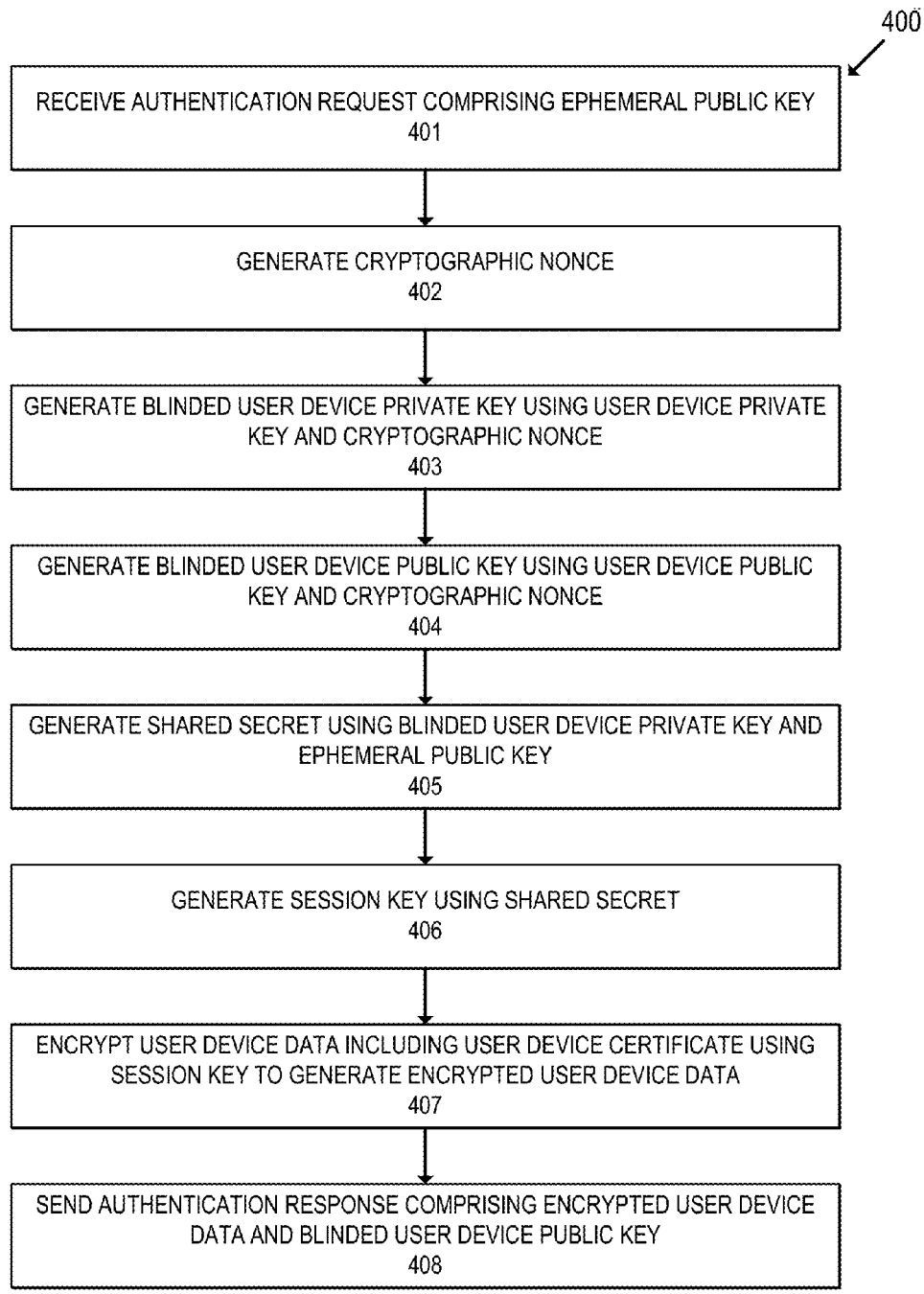
FIG. 4 shows a method of securely transmitting user device data to an access device.

FIG. 4 shows a method 400 of securely transmitting user device data to an access device 102 from the perspective of a user device 101. In some embodiments, method 300 of FIG. 3 may be performed in conjunction with method 400, wherein method 300 is performed by an access device 102, and method 400 is performed by a user device 101.

In some embodiments, method 400 may take place as part of a payment transaction. For example, if user device 101 is a contactless chip card, a user may tap or swipe the chip card against an access device 102 operated by a merchant.

Typically, before the method, portable user device 101 may generate or be loaded with a user device key pair. A "user device key pair" may include a public key (i.e., a "user device public key") and a private key (i.e., a "user device private key"). User device 102 may also comprise a "user device certificate" including the user device public key. The user device certificate may be signed by a certificate authority, such as payment processing network 105 or issuer computer 106.

At step 401, an authentication request is received comprising an ephemeral public key. The ephemeral public key may be of any suitable format, such as ECC or RSA. Typically, the ephemeral public key may be deleted once a communication session between the access device 102 and the portable user device 101 has ended.

At step 402, a cryptographic nonce is generated. The cryptographic nonce may be a random or pseudo-random data value generated using any suitable method.

At step 403, a blinded user device private key is generated using the user device private key and the cryptographic nonce. For example, in some embodiments, the blinded user device private key may be generated by multiplying the user device private key with the cryptographic nonce.

At step 404, a blinded user device public key is generated using the user device public key and the cryptographic nonce. For example, in some embodiments, the blinded user device public key may be generated by multiplying the user device public key with the cryptographic nonce.

At step 405, a shared secret is generated using the blinded user device private key generated at step 403 and the ephemeral public key received at step 401. The shared secret may be generated using any suitable method. For example, in embodiments using elliptic curve cryptography, the shared secret may be determined using the elliptic-curve Diffie-Hellman protocol (ECDH). Typically, the method used to generate the shared secret is the same process used by access device 102 at step 304 of FIG. 3.

At step 406, a session key is generated using the shared secret generated at step 405. The session key may be of any suitable format (e.g., AES, DES, Blowfish, etc.), of any suitable length, and generated using any suitable key derivation function. For example, in one embodiment, the session key may be generated using the Password-Based Key Derivation Function 2 (PBKDF2) algorithm. In some embodiments, other data, such as an access device identifier, may be used as additional inputs to the key derivation function. Typically, the algorithm used to generate the shared secret is the same protocol used by access device 102 at step 304 of FIG. 3. Typically, the method used to derive the session key is the same process used by access device 102 at step 305 of FIG. 3.

At step 407, user device data is encrypted using the session key to generate encrypted user device data. Typically, the user device data may include a user device certificate. In some embodiments, user device data may include other data, such as a user device identifier and/or the cryptographic nonce used to generate the blinded user device public key.

In some embodiments, a second shared secret can used to further user device data, such as a user device public key, returned in the response (in addition to the encryption using the first shared secret generated at step 405). Such embodiments can provide the advantage that the user device data does not need to be decrypted when the first shared secret is used. The key can be decrypted when and where the second shared secret is established, for instance in a separate device (e.g., a hardware security module (HSM)) remotely connected to the access device 102.

At step 408, an authentication response comprising the encrypted user device data and the blinded user device public key is sent.

Similarly to the method of FIG. 3, it should be noted that although the method of FIG. 4 is described with reference to an ephemeral public key (typically received from access device 102), embodiments are not limited to the use of ephemeral keys. For example, in some embodiments, access device 102 may maintain a persistent key pair (i.e., an "access device public/private key pair"), and use the access device public and private keys in place of the ephemeral public and private keys, respectively.

III. Authenticated Communication Flows

A. Deriving a Shared Secret

Figure 5:
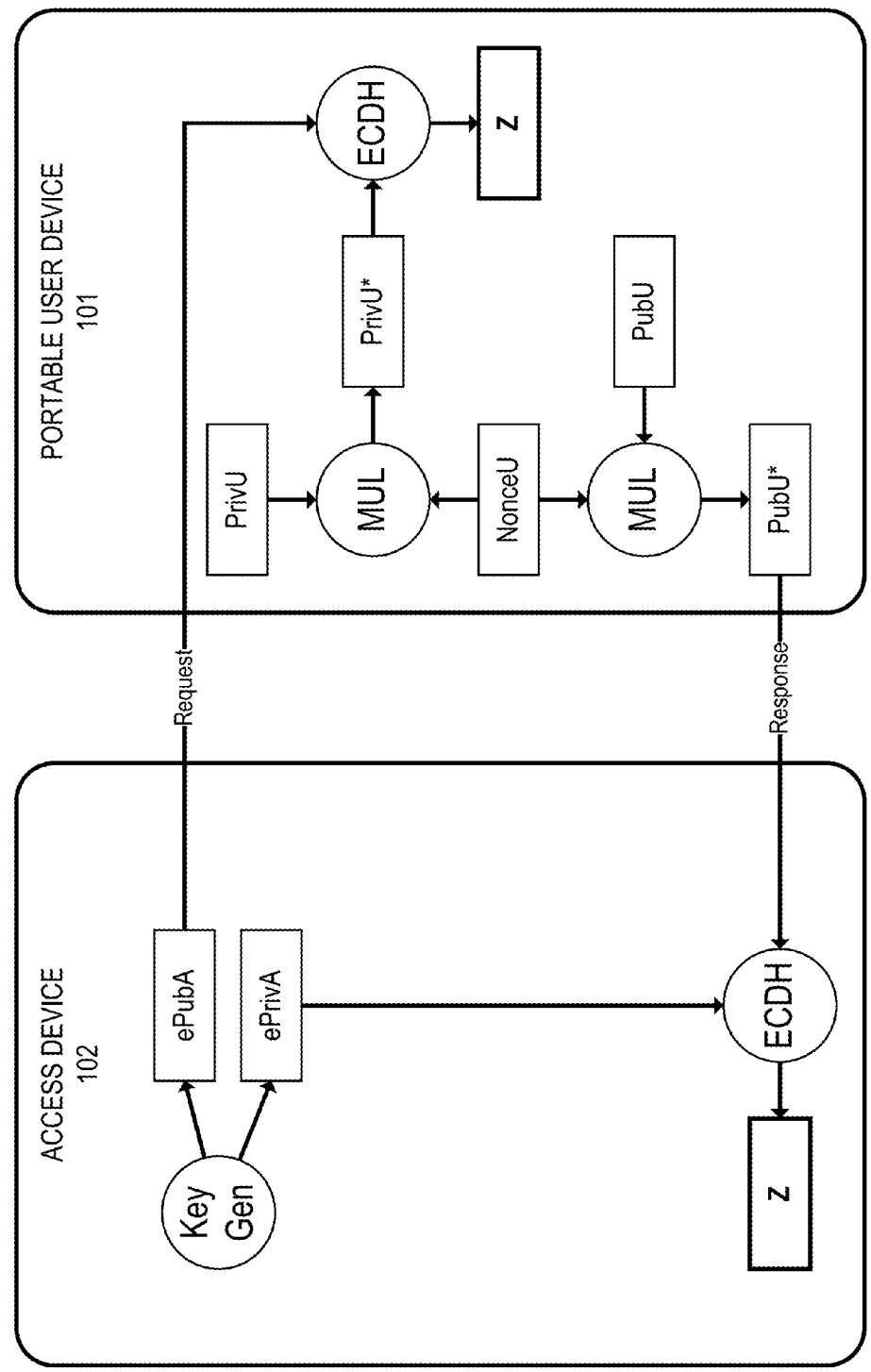
FIG. 5 shows a data flow diagram illustrating operations performed in establishing a shared secret in accordance with some embodiments.

FIG. 5 shows a data flow diagram illustrating operations performed in establishing a shared secret between access device 102 and portable user device 101 in accordance with some embodiments of the invention.

As shown in FIG. 5, access device 102 uses a public/private key pair generator ("KeyGen") to generate an ephemeral public key ("ePubA") and an ephemeral private key ("ePrivA"). Access device 101 sends the ephemeral public key ("ePubT") to portable user device 101 in a request message. Portable user device 101 generates a cryptographic nonce ("NonceC"), and combines ("MUL") the cryptographic nonce ("NonceU") with a user device private key ("PrivU") to generate a blinded user device private key ("PrivU*"). The blinded user device private key ("PrivC*") and an ephemeral public key ("ePubT") are then used as inputs to an elliptic curve Diffie-Hellman ("ECDH") function to generate a shared secret ("Z").

Portable user device 101 also combines ("MUL") the cryptographic nonce ("NonceU") with a user device public key ("PubU") to generate a blinded user device public key ("PubU*"). The blinded user device public key ("PubU*") is transmitted to access device 102 in a response message. Access device 102 uses the blinded user device public key ("PubU*") and the ephemeral private key ("ePrivA") as inputs to the elliptic curve Diffie-Hellman ("ECDH") function to generate the same shared secret ("Z").

In this manner, embodiments can establish a shared secret between access device 102 and portable user device 101.

B. Authenticating a User Device

Figure 6:
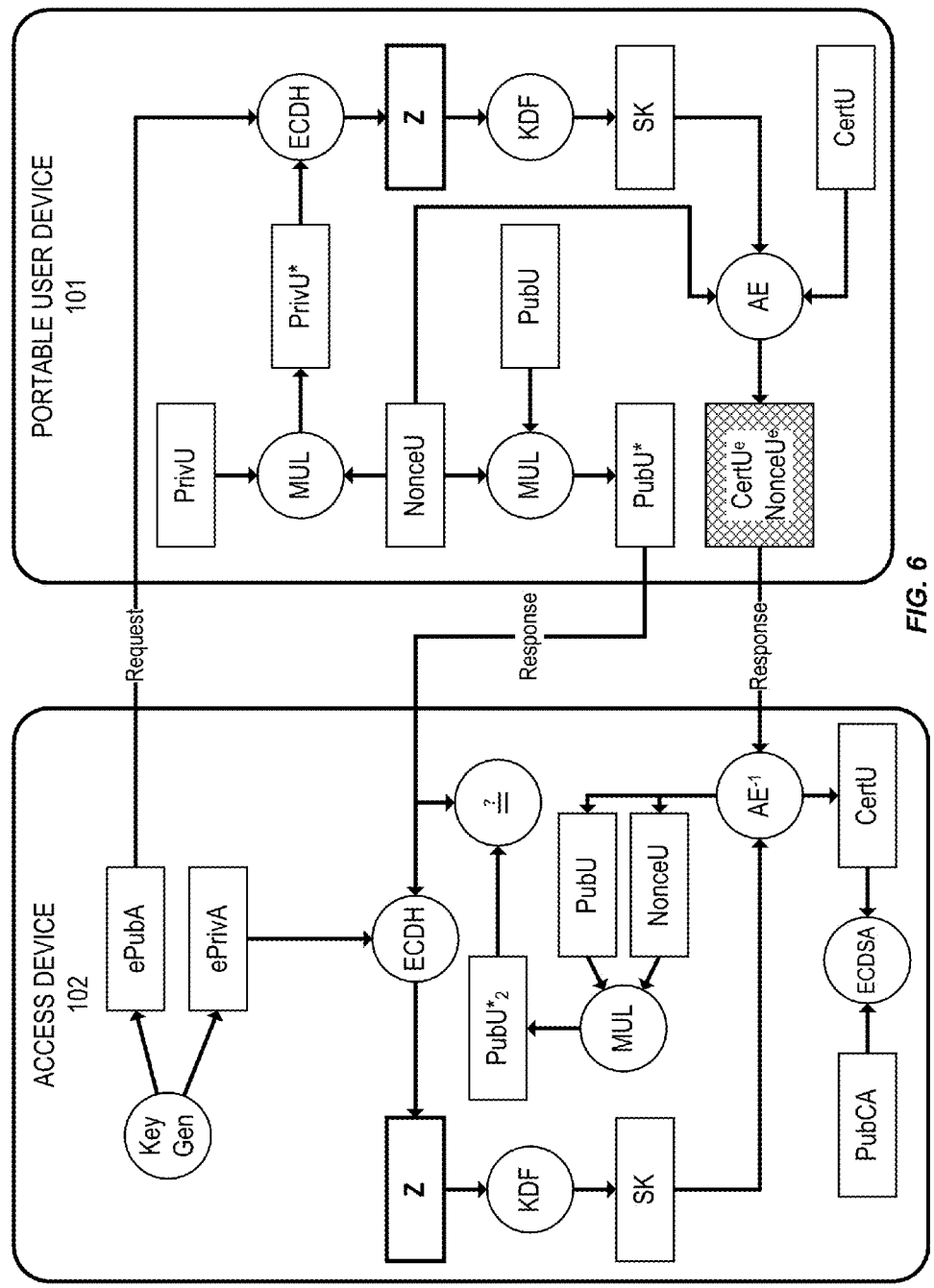
FIG. 6 shows a more detailed data flow diagram illustrating operations performed in a data transmission method according to some embodiments.

FIG. 6 shows a data flow diagram illustrating operations performed in securely authenticating a user device 101 to an access device 102 according to some embodiments.

As shown in FIG. 6, access device 102 uses a public/private key pair generator ("KeyGen") to generate an ephemeral public key ("ePubA") and an ephemeral private key ("ePrivA"). Access device 101 sends the ephemeral public key ("ePubT") to portable user device 101 in a request message. Portable user device 101 generates a cryptographic nonce ("NonceC"), and combines ("MUL") the cryptographic nonce ("NonceU") with a user device private key ("PrivU") to generate a blinded user device private key ("PrivU*"). The blinded user device private key ("PrivC*") and an ephemeral public key ("ePubT") are then used as inputs to an elliptic curve Diffie-Hellman ("ECDH") function to generate a shared secret ("Z").

Portable user device 101 uses shared secret ("Z") as an input to a key derivation function ("KDF") to generate a session key ("SK"). An authenticated encryption cipher ("AE") encrypts a user device certificate ("CertU") and the cryptographic nonce ("NonceU") using the session key ("SK") to generate an encrypted user device certificate ("CertU$^e$") and an encrypted cryptographic nonce ("NonceU$^e$"). Portable user device 101 also combines ("MUL") the cryptographic nonce ("NonceU") with a user device public key ("PubU") to generate a blinded user device public key ("PubU*"). The blinded user device public key ("PubU*"), the encrypted user device certificate ("CertU$^e$"), and the encrypted cryptographic nonce ("NonceU$^e$") are then transmitted to access device 102 in a response message.

Access device 102 uses the blinded user device public key ("PubU*") and the ephemeral private key ("ePrivA") as inputs to the elliptic curve Diffie-Hellman ("ECDH") function to generate the same shared secret ("Z"). The shared secret ("Z") is used as an input to the key derivation function ("KDF") to generate the same session key ("SK"). An authenticated decryption function ("AE$^{-1}$") decrypts the cryptographic nonce ("NonceU"), the user device certificate ("CertU"), and a user device public key ("PubU") included in the user device certificate ("CertU"). An elliptic curve digital signature algorithm ("ECDSA") is used to verify the user device certificate ("CertU") using the certificate authority's public key ("PubCA"). The received blinded user device public key ("PubU*") is verified by comparing it to a blinded user device public key ("PubU*$_2$") generated from the decrypted user device public key ("PubU") and the decrypted cryptographic nonce ("NonceU").

If both the user device certificate and the blinded user device public key are verified, user device 101 is authenticated.

IV. Optimized Authenticated Communication Methods

Figure 7:
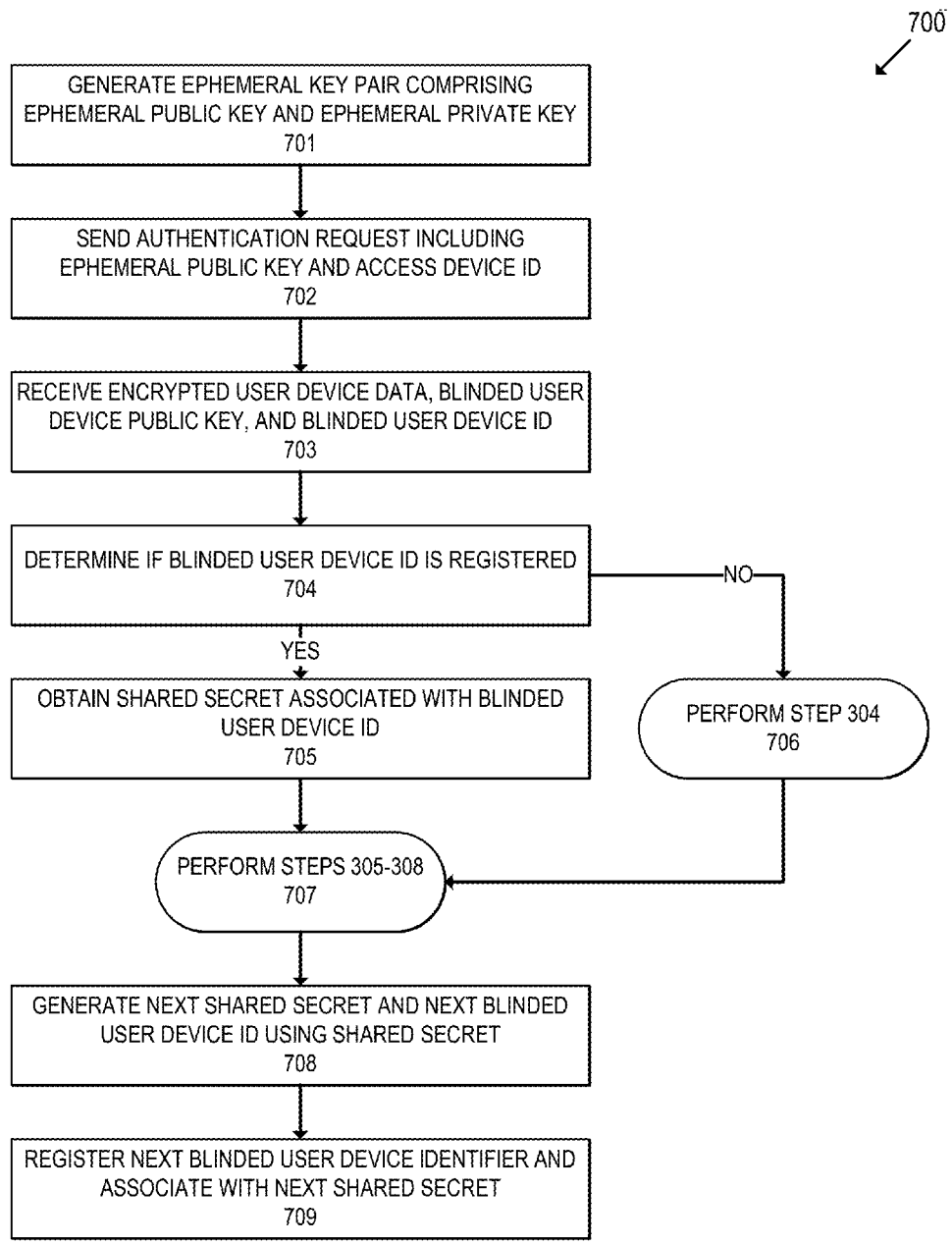
FIG. 7 shows an optimized method of securely obtaining user device data from a user device.
Figure 8:
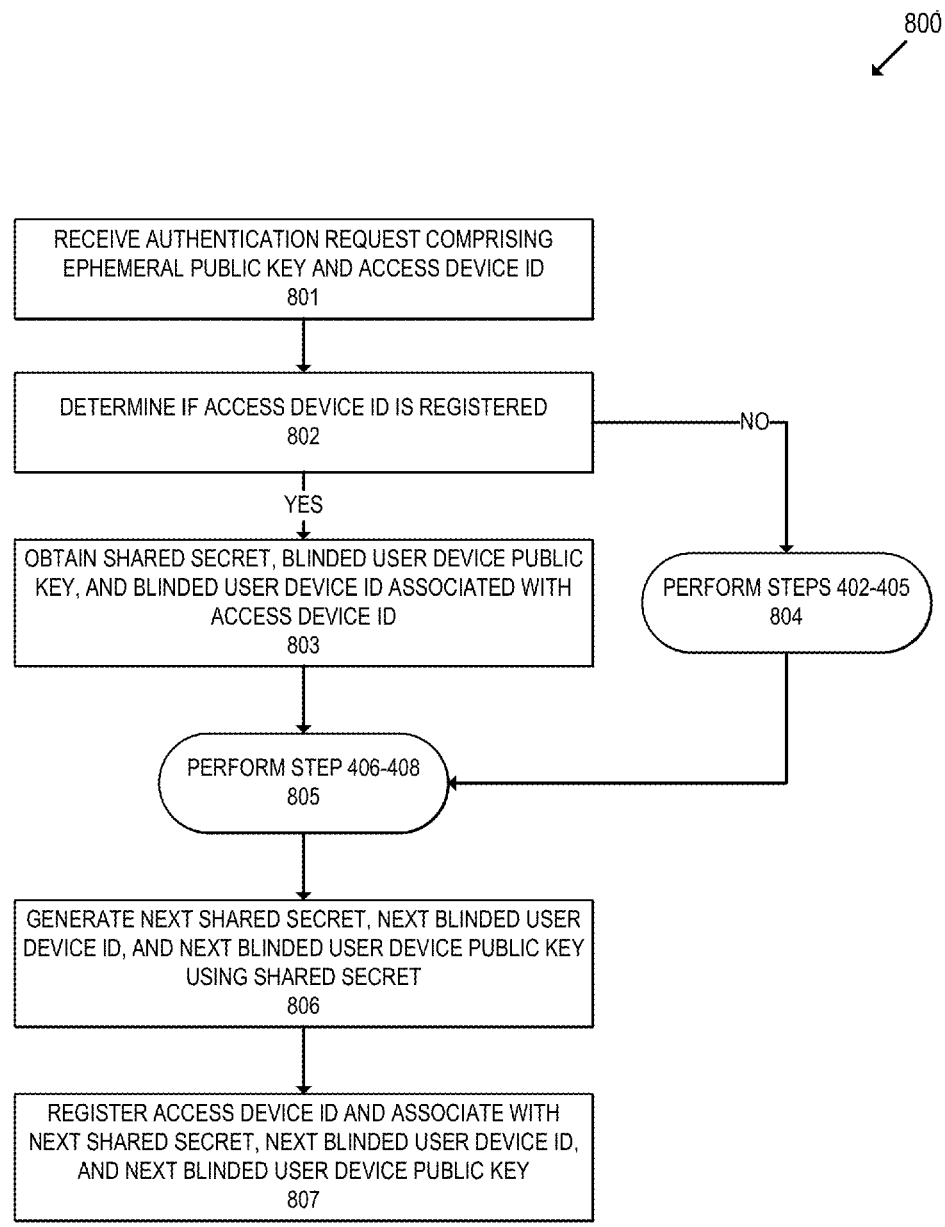
FIG. 8 shows an optimized method of securely transmitting user device data to an access device.

FIGS. 7 and 8, and Tables 1 and 2 describe optimized methods for secure communication in accordance with some embodiments of the invention. Specifically, in some embodiments, a user device 101 and an access device 102 may each maintain a registry of devices with which communication occurred in the past. Each registered device may be associated with a next shared secret and/or other data to be used in future communication sessions with the device. In this manner, embodiments can avoid certain operations, such as a Diffie-Hellman key exchange, in any subsequent communication between two devices. Thus, embodiments can reduce the amount of time and processing needed to establish communication sessions. In addition, embodiments can achieve these benefits while protecting the identity of the user device 101, as will be described in further detail below.

A. Access Device

FIG. 7 shows an optimized method 700 of securely obtaining user device data. In some embodiments, method 700 may comprise some or all steps of method 300 of FIG. 3. In addition, in some embodiments, method 700 may be performed in conjunction with method 800 of FIG. 8, wherein method 700 is performed by an access device 102, and method 800 is performed by a user device 101.

Typically, before the method, portable user device 101 may generate or be loaded with a user device key pair. A "user device key pair" may include a public key (i.e., a "user device public key") and a private key (i.e., a "user device private key"). User device 101 may also comprise a "user device certificate" including the user device public key. The user device certificate may be signed by a certificate authority, such as payment processing network 105 or issuer computer 106.

In addition, both user device 101 and access device 102 may maintain a registry of devices with which prior communication has occurred. A "registry" may include any suitable electronic medium for the storage of data. For example, a registry may comprise a database, a text file, or any other suitable medium.

At step 701, an ephemeral key pair is generated. An "ephemeral key pair" may include a public key (i.e., an "ephemeral public key") and a private key (i.e., an "ephemeral private key") generated for use with a single transaction or other communication session. The ephemeral key pair may be of any suitable format, such as ECC or RSA. Typically, the ephemeral key pair may be deleted once a communication session between the access device 102 and the portable user device 101 has ended.

At step 702, an authentication request is sent to portable user device 101 including the ephemeral public key and an access device identifier associated with access device 102. An "access device identifier" may include any data suitable to identify an access device. In some embodiments, the authentication request may be sent when access device 102 detects a portable user device 101, such as if it passes close to a contactless transceiver.

At step 703, encrypted user device data, a blinded user device public key, and a blinded user device identifier are received from portable user device 101. The "encrypted user device data" may include any data or information associated with a user device. For example, in some embodiments, the encrypted user device data may include an encrypted user device certificate and the cryptographic nonce used to generate the blinded user device public key. The "blinded user device public key" may be generated from a user device public key. For example, the blinded user device public key may be a combination of the user device public key and a cryptographic nonce. The "blinded user device identifier" may be generated from a user device identifier for user device 101. In some embodiments, the user device identifier may be a user device public key. In some such embodiments, the blinded user device identifier may be a truncated version of the blinded user device public key. In other embodiments, the user device identifier may be a serial number, globally unique identifier (GUID), or other data. In some such embodiments, the user device identifier may be a combination of the user device identifier and a cryptographic nonce.

At step 704, it is determined if the blinded user device identifier is registered. For example, in some embodiments, a registry may be searched for the blinded user device identifier.

If the blinded user device identifier is registered, at step 705, a shared secret associated with the blinded user device identifier is obtained. For example, in some embodiments, the shared secret may be retrieved from a record in the registry associated with the blinded user device identifier. The method then proceeds to step 707.

If the blinded user device identifier is not registered, at step 706, step 304 of FIG. 3 is performed. Specifically, a shared secret is generated using the ephemeral private key generated at step 701 and the blinded user device public key received at step 703. The shared secret may be generated using any suitable method. For example, in embodiments using elliptic curve cryptography, the shared secret may be determined using the elliptic-curve Diffie-Hellman protocol (ECDH). The method then proceeds to step 707.

At step 707 of method 700, steps 305-308 of method 300 are performed. Specifically, in some embodiments, the shared secret is used to generate a session key. The session key is used to decrypt the encrypted user device data to determine a user device certificate. The user device certificate and the blinded user device public key are then validated. A transaction is then conducted using the decrypted user device data. Further description of these steps may be found with reference to the corresponding steps in FIG. 3.

At step 708, a next shared secret and a next blinded user device identifier are generated using the shared secret. The next shared secret and the next blinded user device identifier may be generated from the shared secret in any suitable manner. For example, in some embodiments, the next shared secret may be determined using a key derivation function. For instance, the key derivation function used to generate the session key at step 707 may also generate the next shared secret.

The next blinded user device identifier may also be generated using a key derivation function. For example, in some embodiments, the key derivation function used to generate the session key at step 707 may be used to generate a next cryptographic nonce. The next cryptographic nonce and the user device public key may then be used to generate a next blinded user device public key. In some embodiments, the next blinded user device identifier may be a subset of the next blinded user device public key. In other embodiments, the cryptographic nonce may be combined with the blinded user device identifier to determine the next blinded user device identifier. Typically, the process used to determine the next blinded user device identifier at step 708 is also used by user device 101 at step 807 of method 800.

At step 709, the next blinded user device identifier is registered and associated with the next shared secret. For example, in some embodiments, the next blinded user device identifier and the next shared secret may be stored in a registry or database.

B. User Device

FIG. 8 shows an optimized method of securely transmitting user device data to an access device. Typically, before the method, portable user device 101 may generate or be loaded with a user device key pair. A "user device key pair" may include a public key (i.e., a "user device public key") and a private key (i.e., a "user device private key"). User device 101 may also comprise a "user device certificate" including the user device public key. The user device certificate may be signed by a certificate authority, such as payment processing network 105 or issuer computer 106.

In addition, both user device 101 and access device 102 may maintain a registry of devices with which prior communication has occurred. A "registry" may include any suitable electronic medium for the storage of data. For example, a registry may comprise a database, a text file, or any other suitable medium.

At step 801, an authentication request from access device 102 is received comprising an ephemeral public key and an access device identifier. The ephemeral public key may be of any suitable format, such as ECC or RSA. Typically, the ephemeral public key may be deleted once it has been used (e.g., after a communication session between the access device 102 and the portable user device 101 has ended). An "access device identifier" may include any data suitable to identify an access device.

At step 802, it is determined if the access device identifier is registered. For example, in some embodiments, a registry may be searched for the access device identifier.

If the access device identifier is registered, at step 803, a shared secret, a blinded user device public key, and a blinded user device identifier associated with the access device identifier are obtained. For example, in some embodiments, the shared secret, the blinded user device public key, and the blinded user device identifier may be retrieved from a record in the registry associated with the blinded user device identifier. In some embodiments, some or all of the shared secret, the blinded user device public key, and the blinded user device identifier may overlap. For instance, the blinded user device identifier may be a subset (e.g., the last 4 or 8 bits) of the blinded user device public key. Method 800 then proceeds to step 805.

If the access device is not registered, at step 803, steps 402-405 of method 400 are performed. Specifically, in some embodiments, a cryptographic nonce is generated. A blinded user device private key is generated using the cryptographic nonce and the user device private key, and a blinded user device public key is generated using the nonce and the user device public key. A shared secret is then generated using the blinded user device private key and the ephemeral public key received at step 801. Further description of these steps may be found with reference to the corresponding steps in FIG. 4. Method 800 then proceeds to step 805.

At step 805, steps 406-408 of method 400 are performed. Specifically, in some embodiments, a session key is generated using the shared secret. The session key is used to encrypt user device data, such as a user device certificate. An authentication response message is then sent to access device 102, the response including the encrypted user device data and the blinded user device public key. Further description of these steps may also be found with reference to the corresponding steps in FIG. 4.

At step 806, a next shared secret, a next blinded user device identifier, and a next blinded user device public key are generated using the shared secret. The next shared secret, the next blinded user device identifier, and the next blinded user device public key may be generated from the shared secret in any suitable manner. For example, in some embodiments, the next shared secret may be determined using a key derivation function. For instance, the key derivation function used to generate the session key at step 805 may also generate the next shared secret.

The next blinded user device identifier may also be generated using a key derivation function. For example, in some embodiments, the key derivation function used to generate the session key at step 805 may be used to generate a cryptographic nonce. The cryptographic nonce and the user device public key may then be used to generate a next blinded user device public key. In some embodiments, the next blinded user device identifier may be a subset of the next blinded user device public key. In other embodiments, the cryptographic nonce may be combined with the blinded user device identifier to determine the next blinded user device identifier. Typically, the process used to determine the next blinded user device identifier at step 806 is also used by access device 102 at step 708 of method 700.

At step 807, the next blinded user device identifier is registered and associated with the next shared secret. For example, in some embodiments, the next blinded user device public key and the next shared secret may be stored in a registry or database.

C. Pseudo-Code Listing

Tables 1 and 2 below show pseudocode listings to implement a secure method for authenticated data transmission in accordance with some embodiments of the invention.

TABLE 1

| Line | Pseudo-code |
|---|---|
| A1 | GenKeyPair($d_{eA}$; $Q_{eA}$) |
| A2 | SendAuthenticationRequest($ID_{sA}$ ∥ $Q_{eA}$ ∥ $CB_A$) |
| | wait for response: $BData_U$ ∥ $EncData_U$ |
| A3 | $ID_{sU}$ = ($T_8(BData_U)$) |
| A4 | Check $BData_U$ belongs to EC domain |
| A5 | If $ID_{sU}$ not registered: |
| A6 | Z = EC_DH ($d_{eA}$; $BData_U$) |
| A7 | Zeroize $d_{eA}$ |
| A8 | Else: |
| A9 | Obtain Z from $ID_{sU}$ in PB registry |
| A10 | $SK_{CFRM}$ ∥ $SK_{MAC}$ ∥ $SK_{ENC}$ ∥ $SK_{RMAC}$ ∥ NextZ ∥ NextBlind = KDF (Z, len, info ($ID_{sU}$, $ID_{sA}$, $T_{16}(Q_{eA})$)) |
| A11 | Zeroize Z |
| A12 | Header ∥ $C_U$ ∥ $N_U$ ∥ $CB_U$ = $AE^{-1}$ ($SK_{CFRM}$; $EncData_U$) |
| A13 | Verify Header == "KC_1_V" |
| A14 | If ($CB_U$ & PB_INIT): |
| A15 | $NextID_{sU}$ = $T_8$(NextBlind • $Q_{sU}$) |
| A16 | Register Z=NextZ in new entry for $ID_{sU}$ = $NextID_{sU}$ (place [$ID_{sU}$, Z] entry in unused or least used location of PB registry) |
| A17 | If( ($CB_U$ & PB_ INIT ) or ($CB_U$ & NO_PB) ): |
| A18 | Verify $C_U$ signature with ECDSA |
| A19 | Get $Q_{sU}$ from $C_U$ |
| A20 | Verify $BData_U$ = $T_4(N_U)$ • $Q_{sU}$ |
| A21 | (Optional: Conduct additional secure messaging using $SK_{MAC}$, $SK_{RMAC}$, and $SK_{ENC}$) |

Table 1 shows a pseudocode listing to implement a method of securely obtaining user device data from a user device. As described below, the method of Table 1 is performed by an access device 102 communicating with a user device 101. However, in other embodiments, the method may be performed by any other suitable entity.

At step A1, an ephemeral key pair is generated. The ephemeral key pair includes an ephemeral private key ($d_{eA}$) and an ephemeral public key ($Q_{eA}$).

At step A2, an authentication request is sent to user device 101 including an access device identifier ($ID_{sA}$), the ephemeral public key ($Q_{eA}$), and an access device protocol control byte ($CB_A$) that indicates various information regarding access device 102.

After the authentication request is sent, a wait occurs until an authentication response is received from user device 101. The authentication response includes a blinded user device public key (BData$_U$) and encrypted user device data (EncData$_U$).

At step A3, a blinded user device identifier (ID$_{sU}$) is determined by taking the leftmost 8 bytes (T$_8$) of the blinded user device public key (BData$_U$).

At step A4, a check is performed to ensure that the blinded user device public key (BData$_U$) belongs to an expected elliptic curve (EC) domain.

At step A5, a check is performed to determine whether the blinded user device identifier (ID$_{sU}$) was previously registered by access device 102. If the blinded user device identifier (ID$_{sU}$) is not registered, then at step A6 a shared secret (Z) is computed by combining the ephemeral private key (d$_{eA}$) and the received blinded user device public key (Bdata$_U$). Once the shared secret is computed, at step A7 the ephemeral private key is erased.

At step A8, if the blinded user device identifier (ID$_{sU}$) is registered, then at step A9, a shared secret (Z) is obtained from a persistent binding (PB) registry using the blinded user device identifier (ID$_{sU}$).

At step A10, several session keys (SK$_{CFRM}$, SK$_{MAC}$, SK$_{ENC}$, and SK$_{RMAC}$), a next shared secret (NextZ), and a next cryptographic nonce (NextBlind) are derived using a key derivation function (KDF). The inputs to the key derivation function are the shared secret (Z), a desired output length (len), and a combination of the blinded user device identifier (ID$_{sU}$), the access device identifier (ID$_{sA}$), and the left 16 bytes of the ephemeral public key (Q$_{eA}$). Once the key derivation function is completed, at step A11, the shared secret is erased.

At step A12, a derived session key (SK$_{CFRM}$) is used to decrypt the encrypted user device data (EncData$_U$) using an authenticated decryption algorithm (AE$^{-1}$). A header (Header), a user device certificate (C$_U$), a cryptographic nonce (N$_U$), and a user device protocol control byte (CB$_U$) are determined from the decrypted user device data.

At step A13, the header is compared to an expected value. In some embodiments, if the header does not match the expected value, authentication of user device 101 may fail.

At step A14, the user device protocol control byte (CB$_U$) is inspected to determine whether user device 101 intends to compute and register a new shared secret. If so, then at step A15, a next blinded user device identifier (NextID$_{sU}$) is determined using the next cryptographic nonce (NextBind) and the user device public key (Q$_{sU}$). At step A16, the next shared secret (NextZ) and the next blinded user device identifier (NextID$_{sU}$) are registered.

At step A17, the user device protocol control byte (CB$_U$) is inspected to determine whether user device 101 intends to compute and register a new shared secret or if user device 101 does not support persistent binding. If either is the case, then at step A18, the user device certificate (C$_U$) is verified using an elliptic curve digital signature algorithm (ECDSA). In addition, at step A19, the user device public key is determined from the user device certificate (C$_U$). The user device public key (Q$_{sU}$) is combined with the left four bytes of the nonce (N$_U$) to verify that the received blinded user device public key is consistent with the user device certificate. If both the certificate and the blinded user device public key are verified, user device 101 may be authenticated.

At step A21, further communication may be conducted using one or more of the derived session keys.

TABLE 2

| Line | Pseudo-code |
|---|---|
|  | Receive authentication request: ID$_{sA}$ ∥ Q$_{eA}$ ∥ CB$_A$ |
| U1 | CBU = CB$_A$ & 'F0' |
| U2 | Generate Nonce N$_U$ |
| U3 | Look for ID$_{sA}$ in PB registry |
| U4 | If (ID$_{sA}$ is not registered) or ((CB$_A$ & '0F') != PB) : |
| U5 | Validate Q$_{eA}$ belongs to EC domain |
| U6 | Z = EC_DH(N$_U$ • d$_{sU}$; Q$_{eA}$) |
| U7 | BData$_U$ = T$_4$(N$_U$) • Q$_{sU}$ |
| U8 | Else: |
| U9 | Retrieve Z, BData$_U$ from PB registry using ID$_{sA}$ |
| U10 | CB$_U$ ∣= PB |
| U11 | ID$_{sU}$ = T$_8$(BData$_U$) |
| U12 | SK$_{CFRM}$ ∥ SK$_{MAC}$ ∥ SK$_{ENC}$ ∥ SK$_{RMAC}$ ∥ NextZ ∥ NextBlind = KDF (Z, len, info (ID$_{sU}$, ID$_{sA}$, T$_{16}$(Q$_{eA}$)) |
| U13 | Zeroize Z |
| U14 | EncData$_U$ = AE (SK$_{CFRM}$, "KC_1_V" ∥ C$_U$ ∥ N$_U$ ∥ CB$_U$) |
| U15 | If user device supports PB AND (CB$_A$ & NO_PB)==0 AND (ID$_{sA}$ is not registered or (CB$_A$ & PB_INIT)): |
| U16 | Register Z = NextZ, NextBData$_U$ = T$_4$(NextBlind) • Q$_{sU}$ in new entry for ID$_{sA}$ |
| U17 | CB$_U$ ∣= PB_INIT |
| U18 | Else if CB$_U$ != PB: |
| U19 | CB$_U$ ∣= NO_PB |
| U20 | Return BData$_U$ ∥ EncData$_U$ |

Table 2 shows a pseudocode listing to implement a method of securely transmitting user device data to an access device. As described below, the method of Table 2 is performed by a user device 101 communicating with an access device 102. However, in other embodiments, the method may be performed by any other suitable entity.

Prior to the method of Table 2, an authentication request message may be received from access device 102. The authentication request may include an access device identifier (ID$_{sA}$), the ephemeral public key (Q$_{eA}$), and an access device protocol control byte (CB$_A$) that indicates various information regarding access device 102.

At step U1, a user device protocol control byte (CB$_U$) is prepared using the received access device protocol control byte (CB$_A$).

At step U2, a cryptographic nonce (N$_U$) is generated.

At step U3, the received access device identifier (ID$_{sA}$) is looked up in a registry at user device 101.

At step U4, if the access device identifier (ID$_{sA}$) is not registered, or if the access device protocol control byte (CB$_A$) indicates that persistent binding is not supported by access device 101, steps U5-U7 are performed. At step U5, a check is performed to ensure that the ephemeral public key (Q$_{eA}$) belongs to the correct elliptic curve (EC) domain. At step U6, a shared secret (Z)) is computed by combining the ephemeral public key (Q$_{eA}$) and a user device private key (d$_{sU}$) that has been blinded by the nonce (N$_U$). In addition, at step U7, a blinded user device public key (BData$_U$) is generated using a user device public key (Q$_{sU}$) and the left four bytes of the nonce (T$_4$(N$_U$)).

At step U8, if the condition checked at step U4 is not true, then steps U9 and U10 are performed. At step U9, a shared secret (Z) and a blinded user device public key (BData$_U$) are retrieved from a registry using the access device identifier (ID$_{sA}$). At step U10, the user device protocol control byte is updated to indicate that persistent binding is supported.

At step U11, a blinded user device identifier (ID$_{sU}$) is determined by taking the leftmost 8 bytes of the blinded user device public key (BData$_U$).

At step U12, several session keys (SK$_{CFRM}$, SK$_{MAC}$, SK$_{ENC}$, and SK$_{RMAC}$), a next shared secret (NextZ), and a next cryptographic nonce (NextBlind) are derived using a key derivation function (KDF). The inputs to the key derivation function are the shared secret (Z), a desired output length (len), and a combination of the blinded user device identifier ($ID_{sU}$), the access device identifier ($ID_{sA}$), and the left 16 bytes of the ephemeral public key ($Q_{eA}$). Once the key derivation function is completed, at step U13, the shared secret is erased.

At step U14, an authenticated encryption function (AE) is used to encrypt a predefined header ("KC_1_V"), a user device certificate ($C_U$), the cryptographic nonce ($N_U$), and the user protocol control byte ($CB_U$). The result of the encryption function is encrypted user device data (EncData$_U$).

At step U15, if user device 101 and access device 102 support persistent binding (as indicated by their respective protocol control bytes), and either the access device identifier ($ID_{sA}$) is not registered or a re-registration is requested (as indicated by the access control protocol control byte), steps U16-U17 are performed. At step U16, the next shared secret (NextZ), and the next blinded user device public key (NextBData$_U$) are registered and associated with the access device identifier ($ID_{sA}$). At step U17, the user device protocol control byte ($CB_U$) is updated to indicate that user device 101 has computed a new next shared secret associated with access device 102.

At step U18, if the conditional at step U15 is not true and user device 101 does not support persistent binding, then at step U19, the user device protocol control byte ($CB_U$) is updated to indicate that persistent binding is not supported.

At step U20, an authentication response message is sent to access device 102 including the blinded user device public key (BData$_U$) and the encrypted user device data (EncData$_U$).

V. Apparatuses

Figure 9:
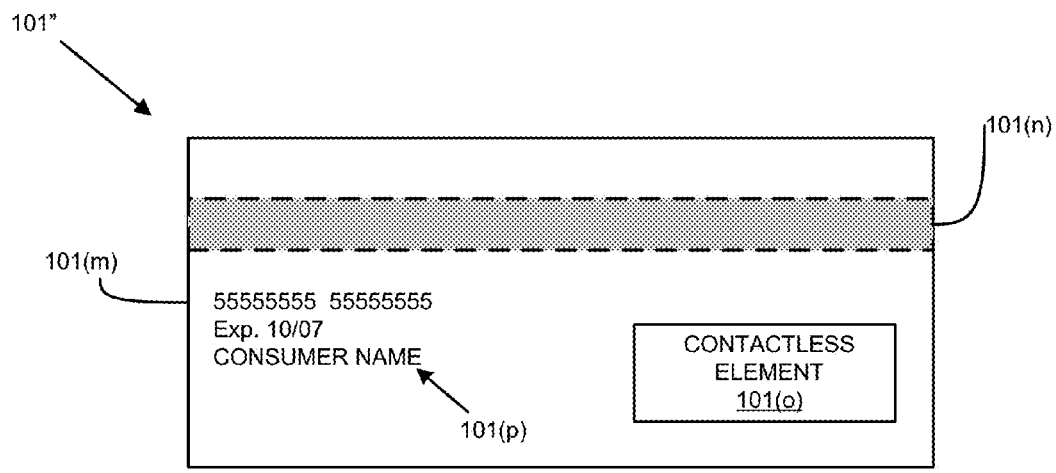
FIG. 9 shows an example of a user device in accordance with some embodiments.

FIG. 9 shows an example of a payment device 101" in the form of a card. As shown, the payment device 101" comprises a plastic substrate 101(m). In some embodiments, a contactless element 101(o) for interfacing with an access device 102 may be present on, or embedded within, the plastic substrate 101(m). User information 101(p) such as an account number, expiration date, and/or a user name may be printed or embossed on the card. A magnetic stripe 101(n) may also be on the plastic substrate 101(m). In some embodiments, the payment device 101" may comprise a microprocessor and/or memory chips with user data stored in them.

As noted above and shown in FIG. 9, the payment device 101" may include both a magnetic stripe 101(n) and a contactless element 101(o). In some embodiments, both the magnetic stripe 101(n) and the contactless element 101(o) may be in the payment device 101". In some embodiments, either the magnetic stripe 101(n) or the contactless element 101(o) may be present in the payment device 101".

Figure 10:
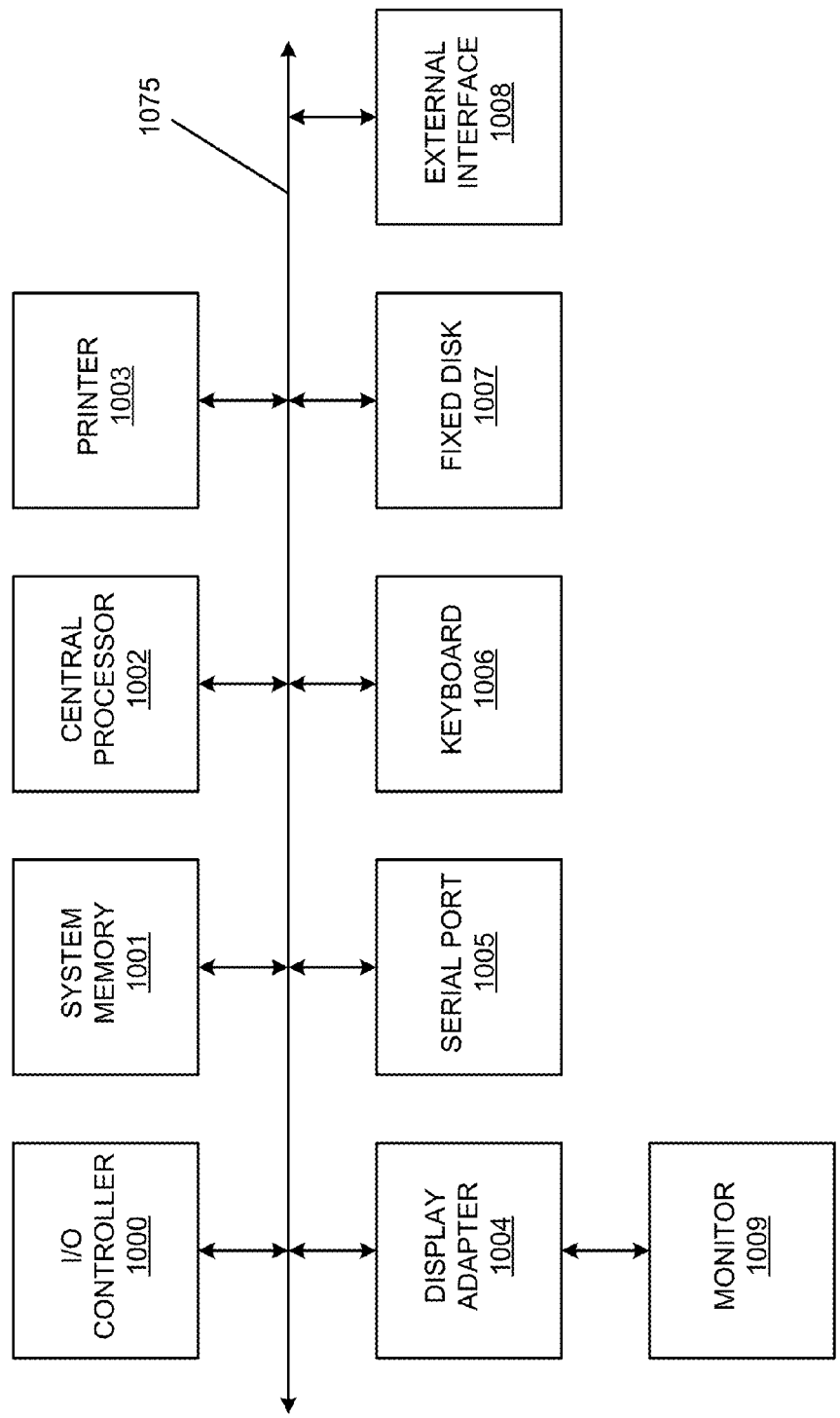
FIG. 10 shows a block diagram of an exemplary computer apparatus.

FIG. 10 is a high level block diagram of a computer system that may be used to implement any of the entities or components described above. The subsystems shown in FIG. 10 are interconnected via a system bus 1075. Additional subsystems include a printer 1003, keyboard 1006, fixed disk 1007, and monitor 1009, which is coupled to display adapter 1004.

Peripherals and input/output (I/O) devices, which couple to I/O controller 1000, can be connected to the computer system by any number of means known in the art, such as a serial port. For example, serial port 1005 or external interface 1008 can be used to connect the computer apparatus to a wide area network such as the Internet, a mouse input device, or a scanner. The interconnection via system bus 1075 allows the central processor 1002 to communicate with each subsystem and to control the execution of instructions from system memory 1001 or the fixed disk 1007, as well as the exchange of information between subsystems. The system memory 1001 and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. An access device comprising:
   a processor; and
   a non-transitory computer-readable storage medium comprising code executable by the processor for implementing a method comprising:
   sending a request message including an access device public key to a user device, wherein the access device public key is associated with an access device private key;
   receiving a response message including a blinded user device public key and encrypted user device data from the user device, the response message being received in response to the sending of the request message, wherein the blinded user device public key is generated by the user device obfuscating a user device public key using a cryptographic nonce, the cryptographic nonce being a randomly generated value or a pseudo-randomly generated value, and wherein the encrypted user device data is encrypted by the user device using a shared secret, the shared secret being different from the cryptographic nonce; and generating the shared secret using the access device private key associated with the access device public key that is included in the request message and using the blinded user device public key; and decrypting the encrypted user device data using the shared secret.

2. The access device of claim 1, wherein the generation of the shared secret by the user device is not based on any other keys from the access device besides those included in the request message, and wherein the generating of the shared secret by the access device is not based on any other keys from the user device besides those included in the response message.

3. The access device of claim 1, wherein the access device public key and the access device private key form an ephemeral key pair, the method further comprising deleting the ephemeral key pair after the generating of the shared secret.

4. The access device of claim 1, wherein decrypting the encrypted user device data using the shared secret comprises generating a session key using the shared secret.

5. The access device of claim 1, wherein the user device data comprises a user device certificate comprising a user device public key and the cryptographic nonce used to generate the blinded user device public key, and wherein the method further comprises:

validating the user device certificate;

generating a second blinded user device public key using the user device public key and the cryptographic nonce; and comparing the second blinded user device public key with the received blinded user device public key, wherein the user device is authenticated if the second blinded user device public key matches the received blinded user device public key.

6. The access device of claim 1, wherein the shared secret is a first shared secret, and wherein the method further comprises:

generating a second shared secret using the first shared secret; and associating the second shared secret with the user device, wherein the second shared secret is used to decrypt subsequent user device data received from the user device.

7. The access device of claim 1, the method further comprising:

conducting a transaction using the user device data.

8. The access device of claim 1, wherein the access device is in a system, the system further comprising:

the user device, wherein the user device is configured to:
receive the access device public key;
generate the shared secret using the access device public key, a user device private key, and the cryptographic nonce;
encrypt user device data using the shared secret; and
send the response message including the encrypted user device data and the blinded user device public key to the access device.

9. The access device of claim 1, wherein the method further comprises:

determining that the user device has entered a contactless field of the access device, wherein the sending of the request message occurs in response to the determining that the user device has entered the contactless field of the access device, and wherein the request message is sent via the contactless field.

10. The access device of claim 1, wherein the user device public key and a user device private key form a user device key pair, wherein the user device generates the shared secret using the user device private key, the cryptographic nonce, and the access device public key.

11. The access device of claim 1, wherein the user device public key is included in a certificate for authenticating the user device, the certificate being signed by a certificate authority, and wherein the certificate is included in the encrypted user device data.

12. A computer-implemented method comprising:

sending, by an access device having one or more processors, a request message including an access device public key to a user device, wherein the access device public key is associated with an access device private key;

receiving, by the access device, a response message including a blinded user device public key and encrypted user device data from the user device, the response message being received in response to the sending of the request message, wherein the blinded user device public key is generated by the user device obfuscating a user device public key using a cryptographic nonce, the cryptographic nonce being a randomly generated value or a pseudo-randomly generated value, and wherein the encrypted user device data is encrypted by the user device using a shared secret, the shared secret being different from the cryptographic nonce; and generating, by the access device, the shared secret using the access device private key associated with the access device public key that is included in the request message and using the blinded user device public key included in the response message, wherein the shared secret is known to the user device.

13. The computer-implemented method of claim 12, wherein the generation of the shared secret by the user device is not based on any other keys from the access device besides those included in the request message, and wherein the generating of the shared secret by the access device is not based on any other keys from the user device besides those included in the response message.

14. The computer-implemented method of claim 12, wherein the access device public key and the access device private key form an ephemeral key pair, wherein the ephemeral key pair is deleted after shared secret is generated.

15. The computer-implemented method of claim 12, further comprising:

generating, by the access device, a session key using the shared secret.

16. The computer-implemented method of claim 15, further comprising:

decrypting, by the access device, the encrypted user device data using the session key to determine user device data.

17. The computer-implemented method of claim 16, wherein the user device data comprises a user device certificate comprising a user device public key and a cryptographic nonce used to generate the blinded user device public key, and wherein the method further comprises:
- validating, by the access device, the user device certificate;
- generating, by the access device, a second blinded user device public key using the user device public key and the cryptographic nonce; and
- comparing, by the access device, the second blinded user device public key with the received blinded user device public key, wherein the user device is authenticated if the second blinded user device public key matches the received blinded user device public key.

18. The computer-implemented method of claim 16, wherein the shared secret is a first shared secret, and wherein the method further comprises:
- generating, by the access device, a second shared secret using the first shared secret; and
- associating, by the access device, the second shared secret with the user device, wherein the second shared secret is used to decrypt subsequent user device data received from the user device.

19. The computer-implemented method of claim 16, further comprising:
- conducting, by the access device, a transaction using the user device data.

20. A computer-implemented method comprising:
- receiving, by a user device, a request message including an access device public key from an access device;
- generating, by the user device, a cryptographic nonce, the cryptographic nonce being a randomly generated value or a pseudo-randomly generated value;
- generating, by the user device, a shared secret using the access device public key included in the request message, a user device private key, and the cryptographic nonce, the shared secret being different from the cryptographic nonce;
- generating, by the user device, a blinded user device public key by obfuscating a user device public key using the cryptographic nonce;
- encrypting, by the user device, user device data using the shared secret; and
- sending, by the user device, a response message including the blinded user device public key and the encrypted user device data to the access device in response to the receiving of the request message, thereby allowing the access device to generate the shared secret using the blinded user device public key and an access device private key corresponding to the access device public key and to decrypt the encrypted user device data using the shared secret.

21. The computer-implemented method of claim 20, wherein the generating of the shared secret by the user device is not based on any other keys from the access device besides those included in the request message, and wherein the generation of the shared secret by the access device is not based on any other keys from the user device besides those included in the response message.

22. The computer-implemented method of claim 20, further comprising:
- encrypting, by the user device, user device data using a session key to generate encrypted user device data wherein the user device data comprises a user device certificate, and wherein the access device authenticates the user device using the user device certificate and the cryptographic nonce; and
- sending, by the user device, the encrypted user device data to the access device.

23. An user device comprising:
- a processor; and
- a non-transitory computer-readable storage medium comprising code executable by the processor for implementing a method comprising:
  - receiving a request message including an access device public key from an access device;
  - generating a cryptographic nonce, the cryptographic nonce being a randomly generated value or a pseudo-randomly generated value;
  - generating a shared secret using the access device public key included in the request message, a user device private key, and the cryptographic nonce, the shared secret being different from the cryptographic nonce;
  - generating a blinded user device public key by obfuscating a user device public key using the cryptographic nonce;
  - encrypting user device data using the shared secret; and
  - sending a response message including the blinded user device public key and the encrypted user device data to the access device in response to the receiving of the request message, thereby allowing the access device to generate the shared secret using the blinded user device public key and an access device private key corresponding to the access device public key and to decrypt the encrypted user device data using the shared secret.

24. The user device of claim 23, wherein the generating of the shared secret is not based on any other keys from the access device besides those included in the request message, and wherein the generation of the shared secret by the access device is not based on any other keys from the user device besides those included in the response message.

25. The user device of claim 23, wherein the method further comprises:
- encrypting user device data using a session key to generate encrypted user device data wherein the user device data comprises a user device certificate, and wherein the access device authenticates the user device using the user device certificate and the cryptographic nonce; and
- sending the encrypted user device data to the access device.

* * * * *